United States Patent [19]
Toyota

[11] Patent Number: 5,866,028
[45] Date of Patent: Feb. 2, 1999

[54] FERRITE MAGNET, AND POWDER FOR FERRITE MAGNET AND PRODUCTION PROCESS THEREOF

[75] Inventor: Sachio Toyota, Osaka, Japan

[73] Assignee: Sumitomo Special Metals, Co., Ltd., Osaka, Japan

[21] Appl. No.: 930,222

[22] PCT Filed: Mar. 24, 1997

[86] PCT No.: PCT/JP97/00962

§ 371 Date: Oct. 3, 1997

§ 102(e) Date: Oct. 3, 1997

[87] PCT Pub. No.: WO97/35815

PCT Pub. Date: Oct. 2, 1997

[30] Foreign Application Priority Data

Mar. 26, 1996 [JP] Japan .................................. 8-097777

[51] Int. Cl.$^6$ ................................................ C04B 35/26
[52] U.S. Cl. ................................... 252/62.63; 252/62.59; 264/428; 264/613
[58] Field of Search ............................. 252/62.63, 62.59; 264/428, 613

[56] References Cited

U.S. PATENT DOCUMENTS 4,397,796  8/1983  Lotgering et al. ........................ 264/24
5,061,412  10/1991  Okumori et al. ......................... 264/24

FOREIGN PATENT DOCUMENTS 2-120237  5/1990  Japan .................................. 252/62.63
2001949  2/1976  United Kingdom .

OTHER PUBLICATIONS

S. Ram et al., "Development of High–Quality Ceramic Powders . . . Permanent Magnet Devices" in *IEEE Transactionis on Magnetics*, m vol. 28, No. 1, Jan. 1992, pp. 15–20.

*Primary Examiner*—Melissa Bonner
*Attorney, Agent, or Firm*—Watson Cole Grindle Watson, P.L.L.C.

[57] ABSTRACT

It is an object of the present invention, in the W-type ferrite which is formulated as $SrO.2(FeO).n(Fe_2O_3)$, to provide the ferrite magnet and the manufacturing process thereof by which said W-type magnet maintains cost-performance characteristics recognized with the conventional M-type magnet and furthermore exhibits the maximum energy products more than 5 MGOe. In order to achieve the aforementioned object, carbon elements are admixed to raw powder which is a previously prepared mixture of $SrCO_3$ and $Fe_2O_3$ under a given condition such that n-value in the above formula is in a range between 7.2 and 7.7. After the calcining said mixture, CaO, $SiO_2$ and C powders are furthermore mixed and pulverized to have an average particle size of less than 0.06 $\mu$m, followed by forming into a green compact body under a magnetic field and sintering the formed product under a non-oxidizing atmosphere. Hence the W-type ferrite, which has not been realized before, can be produced easily and with low cost.

7 Claims, 11 Drawing Sheets

FERRITE MAGNET, AND POWDER FOR FERRITE MAGNET AND PRODUCTION PROCESS THEREOF

TECHNICAL FIELD

The present invention relates to the W-type ferrite magnet which is basically formulated as $SrO.2(FeO).n(Fe_2O_3)$; more specifically the invention relates to ferrite magnet, and powders for fabricating said ferrite magnet and production process thereof which is characterized by the maximum energy products more than 5 MGOe, which has not ever achieved by the conventional M-type ferrite magnet, through mixing raw powders in such a way that the n-value in the aforementioned chemical formula is within the most optimum range, adding a certain type of additive element(s) after the calcining, controlling the particle size in a given range, forming the green compact using the calcined powders, and sintering the formed green compact.

BACKGROUND ART

The oxide magnet material typified by the $SrO-6Fe2O3$, which is a magnet plumbite type hexagonal ferrite and is so-called M-type ferrite, was proposed by J. J. Went et al., (Philips, 1952). Since then, it has been mass-produced and utilized in versatile fields due to its excellent magnetic characteristics and high cost-performance.

Currently, an environmental demands requires the low fuel-cost ratio for automobiles, accordingly the light-weight structure for the main body of the automobiles is promoted. As a result, in order to produce electronic parts with smaller and lighter structure, magnets which serve as major components for these electric parts are urgently needed to be fabricated with much smaller size with higher efficiency.

However, since the degree of magnetization of the above mentioned M-type magnet is small, it has been difficult to obtain the better magnetic properties; for example the maximum energy products—(BH)max—more than 5 MGOe.

In order to provide a ferrite material with larger degree of magnetization than the conventional M-type magnet, it has been proposed that $SrO—Fe_2O_3$ which is a principle constituent of the M-type magnet is expanded to the ternary system such as $SrO—MeO—Fe_2O_3$(where Me represents divalent metallic ions such as Co, Zn, or Fe), so that four types (W-type, X-type, Y-type, and Z-type) of more complicated hexagonal ferrite magnets having much stronger ferromagnetism can be fabricated.

Among these, it was found that the W-type magnet has a similar crystalline structure as the conventional M-type magnet and exhibits superior properties such as saturation magnetization of about 10% higher than the M-type magnet and approximately same anisotropic magnetic field. However, the W-type magnet has not been realized.

For example, F. K. Lotgerin et al. proposed the W-type magnets which were consisted of $BaO.2(FeO).8(Fe_2O_3)$ and $SrO.2(FeO).8(Fe_2O_3)$ in Journal of Applied Physics (vol.51, p.5913, 1980). However, several drawbacks associated with the proposed magnet were reported; they included (1) a complicated control was required for the sintering atmosphere, and (2) the maximum energy products, (BH) max, for Ba-system magnet was 4.3 MGOe while the (BH)max value for the Sr-system magnet was 3.8 MGOe. Hence these maximum energy product values indicated that these proposed magnets did not possess superior magnetic properties to the conventional M-type magnets.

Moreover, S. Ram et al. reported that the maximum energy products, (BH)max of the $Sr_{0.9}Ca_{0.1}O.2(ZnO).8$ $(Fe_2O_3)$ was 2.7 MGOe in IEEE Trans. Magn., vol.1, p.15; 1992. However, this type of magnet was not realized yet.

As a consequence, in order to overcome the problems found in the above articles, it is an object of the present invention to provide a ferrite magnet, and powder for the ferrite magnet as well as production process thereof, by which the W-type magnet can be formulated as $SrO.2(FeO)$ $.n(Fe_2O_3)$, maintaining a similar cost-performance recognized with the conventional M-type magnet and exhibiting an excellent magnetic property such as the maximum energy product value exceeding 5 MGOe.

DISCLOSURE OF INVENTION

The present inventors have recognized that the W-type magnet has a larger magnetization than the conventional M-type magnet. We have found that there was an optimum range for the n-value in the formula $SrO.2(FeO).n(Fe_2O_3)$. Furthermore, after the continuous and diligent efforts for finding appropriate types of additives in order to improve the magnetic properties, we came to a conclusion that the magnetic properties can be remarkably improved by adding certain types of plurality of additive elements after the calcining process.

Moreover, we have completed the presently applied invention by finding that the ferrite magnet can be fabricated having the maximum energy products, (BH)max, exceeding 5 MGOe (which any one of the conventional M-type magnets can not be achieved) through the following sequential processes; i.e., (1) preparing raw powders being admixed with a certain type of additives, (2) pulverizing the raw powders in order to have an average particle size less than 0.06 $\mu$m (by the BET measurement), (3) forming the green compact body under the magnetic field, and (4) sintering the formed compact in a non-oxidizing atmosphere.

Namely, for more details, the present invention is characterized by the following processes; (1) preparing raw powders which are mixture of $SrCO_3$ and $Fe_2O_3$ with a given mol ratio ranging from 1:8.2 to 1:8.7, (2) adding carbon with 0.3 to 5.0 weight %, (3) calcining the mixture, (4) further adding CaO with 0.3 to 1.5 weight %, $SiO_2$ with 0.1 to 0.6 weight % and C with 0.1 to 0.5 weight %, (5) pulverizing the mixture into fine particles having an average particle size of less than 0.06 $\mu$m, (6) forming the green compact body under the applying the magnetic field, and (7) sintering the formed compact body in a non-oxidizing atmosphere. As a result, the ferrite magnet can be obtained which has a chemical formula as $SrO.2(FeO).n(Fe_2O_3)$ having an optimum range of n-value in the above formula between 7.2 and 7.7, has an average grain size of the sintered body of less than 2 $\mu$m, and exhibits the maximum energy products, (BH)max, of more than 5 MGOe.

The present invention proposes also the production process for the aforementioned ferrite magnets, being characterized by the processes such as (1) a process in which, after the calcination process, in addition to the above mentioned additives, furthermore at least either one of $Cr_2O_3$ (0.2 to 0.8 weight %) or CoO (0.2 to 0.8 weight %) is added, (2) a process by which the formed green compact body is dried under a temperature range between 100° C. and 200° C., and (3) a process for which an oxidizing agent or a reducing agent is added during the sintering process.

Moreover, the present invention is characterized by producing powders used for the ferrite magnets, which can be effectively utilized as powders for bonded magnets or sintered magnets, by adding carbon of 0.3 to 5.0 weight % to raw powders which are previously mixed with $SrCO_3$ and $Fe_2O_3$ under a given mol ratio ranging from 1:8.2 to 1:8.7, calcining the thus prepared mixture, and pulverizing the calcined powders into fine particles with an average particle size less than 3 $\mu$m.

The above and many other objectives, features and advantages of the present invention will be fully understood from the ensuing detailed description of the examples of the invention, which description should be read in conjunction with the accompanying drawings.

BEST MODE FOR CARRYING OUT THE INVENTION

The followings are sequential processes to produce the ferrite magnet according to the present invention;

1) mixing $SrCO_3$ and $Fe_2O_3$ with a certain mol ratio to prepare raw powders,
2) admixing carbon to raw powders,
3) calcining the admixture,
4) adding CaO, $SiO_2$, and C to the calcined powders after the calcination,
5) pulverizing the mixture of powders to have an average particle size of less than 0.06 $\mu$m,
6) forming the thus pulverized powders under the magnetic field, and
7) sintering the formed green compact in a non-oxidizing atmosphere.

Figure 1:
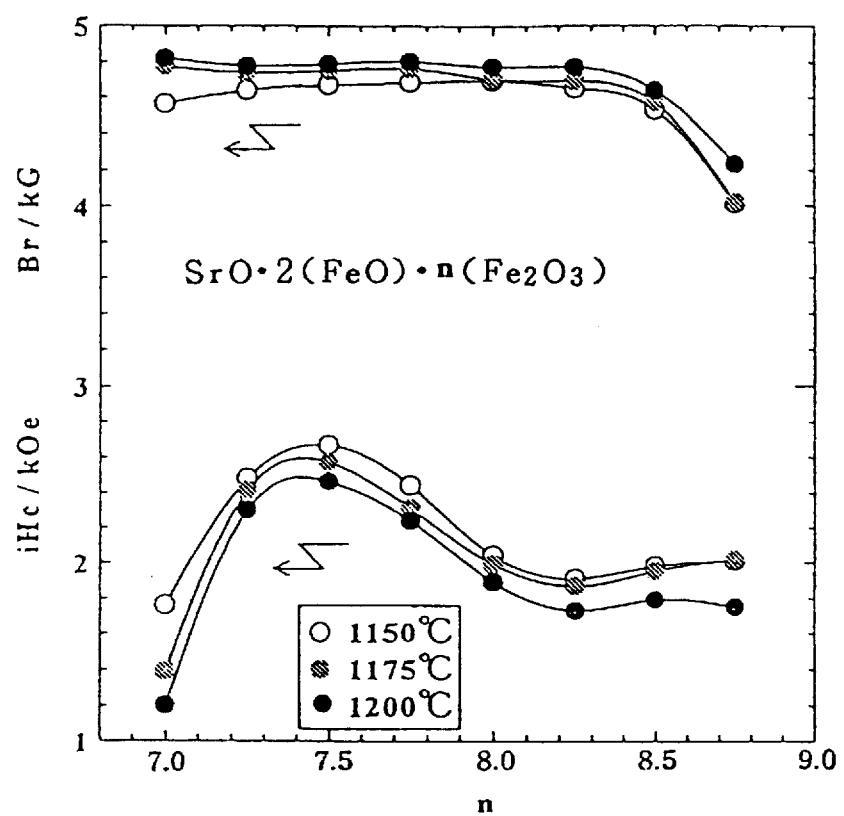
FIG. 1 shows changes in intrinsic coercive force, iHc, and residual magnetic flux density, Br, of the magnet when the n-value in the composition of $SrO.2(FeO).n(Fe_2O_3)$ varies for three different sintering temperatures.

First of all, the present inventors have chosen the appropriate n-value range in W-type magnet being formulated as $SrO.2(FeO).n(Fe_2O_3)$. When raw powders are prepared, a mixture of $SrCO_3$ and $Fe_2O_3$ are admixed under various mol ratios. The mixture was then subjected to the calcination at a temperature of 1,340° C. in nitrogen gas atmosphere. Furthermore, the calcined mixture was pulverized into fine particles having an average particle size of 0.06 $\mu$m. The pulverized particles were then formed into a green compact body under applying the magnetic field. The formed green bodies were finally sintered at three different sintering temperatures of 1,150° C., 1,175° C., and 1,200° C. FIG. 1 shows the changes in the intrinsic coercive force, iHc, and residual flux density, Br, of variously prepared magnets when n-value is altered in a range from 7.0 to 8.75 (on x-axis).

As clearly seen in FIG. 1, it was found that, when n-value in the aforementioned formula is either less than 7.2 or more than 7.7, the coersive force (iHc) reduced and the target value of the maximum energy products, (BH)max, of 5 MGOe was not achieved. Therefore, it is necessary to define the n-value within a range from 7.2 to 7.7. In order to achieve this limitation for n-values in the formula $SrO.2(FeO).n(Fe_2O_3)$, it was found that $SrCO_3$ and $Fe_2O_3$ powders should be mixed under a range of mol ratio between 1:8.2 to 1:8.7.

Figure 2:
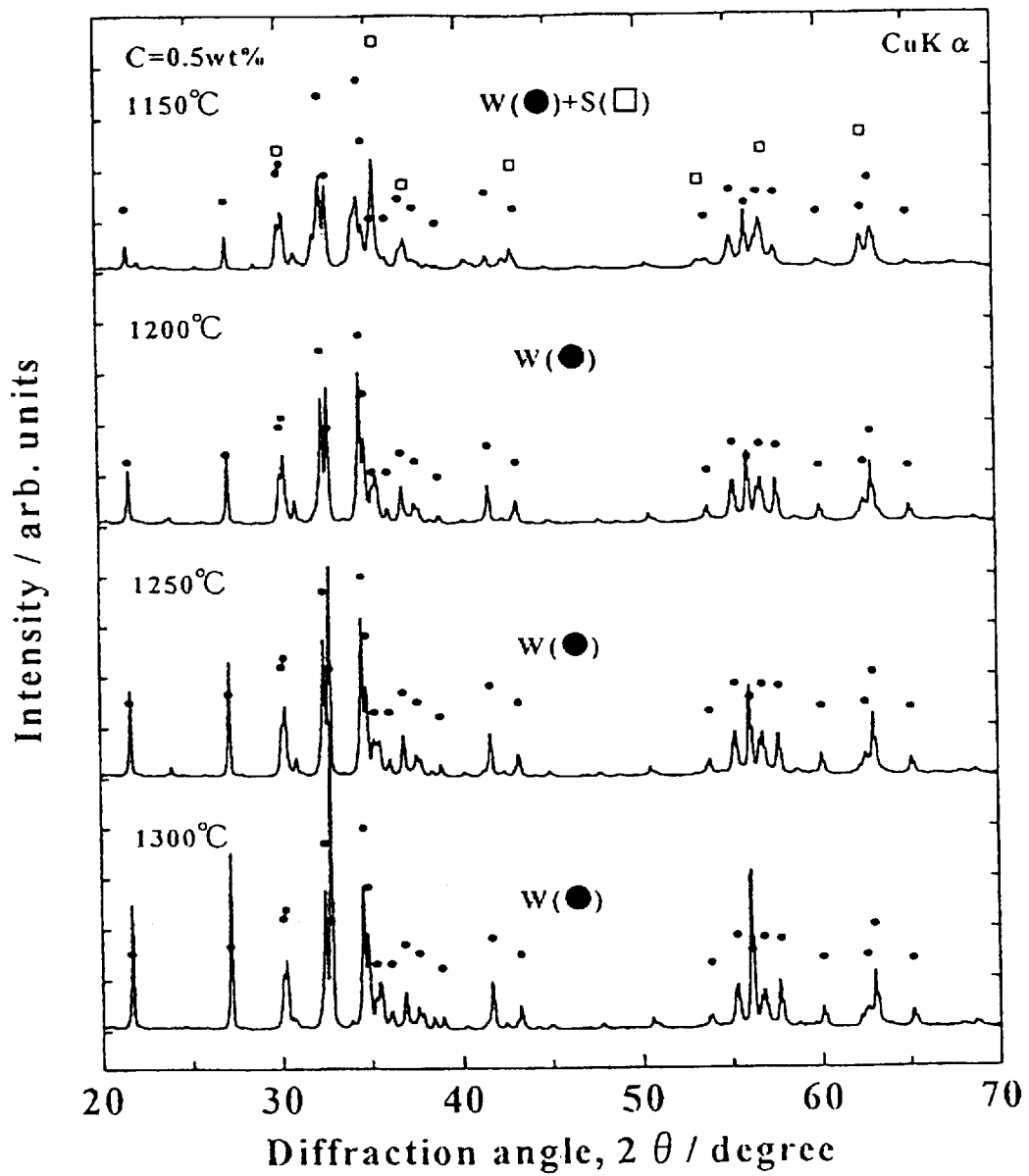
FIG. 2 shows x-ray diffractograms of calcined powders being heated at four different temperatures when 0.5 weight % of carbon was added to raw powders.
Figure 3:
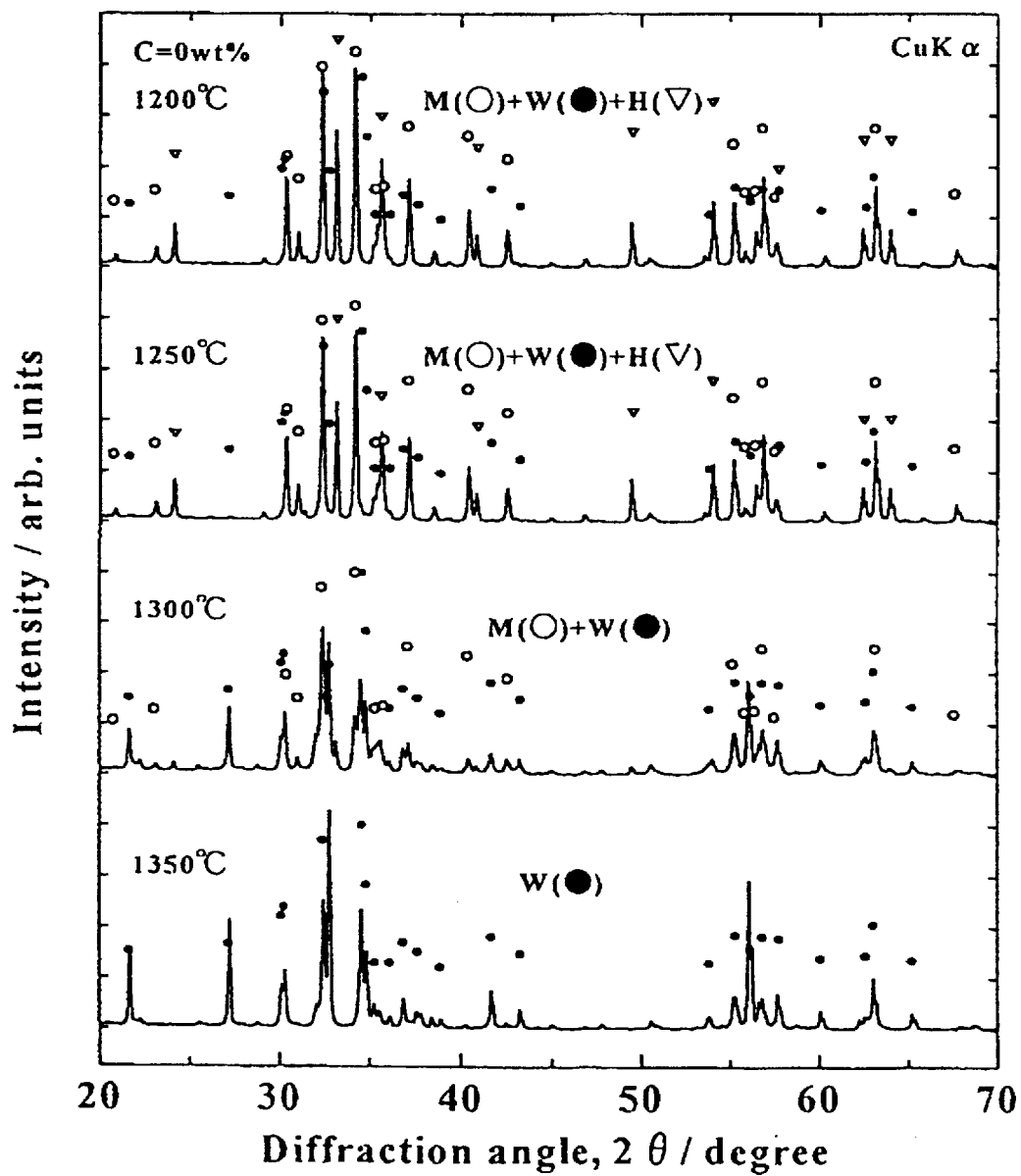
FIG. 3 shows x-ray diffractograms of calcined powders being heated at four different temperatures when carbon was not added to raw powders.

FIG. 2 shows x-ray diffractograms for identifying crystalline structures of calcined powder being heated at 1,150° C., 1,200° C., 1,250° C., and 1,300° C. in nitrogen atmosphere, after said raw powders were mixed with carbon powders of 0.5 weight %. Moreover, the x-ray diffractograms of crystalline structures of the calcined powder being heated under the same conditions as above except that carbon powders were not admixed to raw powders were shown in FIG. 3. Different marks used in FIGS. 2 and 3 (for example, circles, triangles, and squares) represent the diffraction intensities for each respective calcining temperature. The closed marked represent data for W-type and the open marks indicate data obtained form M-type magnets, respectively.

In a case when carbon powders are not mixed to raw powders, the sintering temperature for W-type magnets is limited to a relatively high temperature; while by adding carbon powders to raw powders the W-type magnets can be fabricated in a wider range of calcining temperature, so that production cost can be reduced, the productivity can be enhanced, and the improved intrinsic coercive force can be achieved by using refined particles.

As a consequence, as described previously, 0.3 to 5.0 weight % of carbon powders are mixed to raw powders which are previously prepared by mixing $SrCO_3$ and $Fe_2O_3$ with a certain predetermined mol ratio. Carbon powders—which serves as a reducing agent—are added in order to prevent the oxidation of raw powders upon the subsequent calcination process. If the amount of carbon to be added prior to the calcination process is less than 0.3 weight %, the calcining temperature cannot be defined in a wider range of temperature; on the other hand, if the carbon addition amount exceeds 5.0 weight %, it will become more difficult to produce the W-type ferrite and also deteriorate the magnetic properties even if the W-type magnet would be fabricated. As a result, the amount of carbon to be added to raw powders prior to the calcination process should be limited within an appropriate range between 0.3 weight % and 5.0 weight %.

In the next step, the raw powders admixed with carbon with a certain amount will be calcined. Since the W-type magnet contains divalent iron ion ($Fe^{++}$), the atmosphere for calcination is needed to be controlled. Although nitrogen gas would be suitable as a non-oxidizing atmosphere, the calcination in air can be possible, depending upon the amount of added carbon powders. Furthermore, the calcining temperature depends upon the amount of added carbon, too. It was found that the calcining temperature ranging from 1,150° C. to 1,400° C. would be the most suitable to the present invention.

As indicated in the x-ray diffractograms for structural phases formed in the calcined powders (see FIG. 2), W-type ferrite was obtained. As a consequence, the calcined powders can further be pulverized into fine particles to provide raw powders which can be utilized to produce bonded magnets or sintered magnets. If they are utilized to produce bonded magnets, it is preferable that the calcined powders are pulverized into fine particles in a range from 0.07 $\mu$m to 3 $\mu$m. If they are utilized to produce sintered magnet, it is desirable that the calcined powders are pulverized to a particle size less than 0.06 $\mu$m.

On the other hand, according to the present invention, CaO (0.3 to 1.5 weight %), $SiO_2$ (0.1 to 0.6 weight %) and C (0.1 to 0.5 weight %) are added to calcined powders. These three additives contribute to improve the residual flux density (Br) and intrinsic coercive force (iHc) as well.

Figure 4:
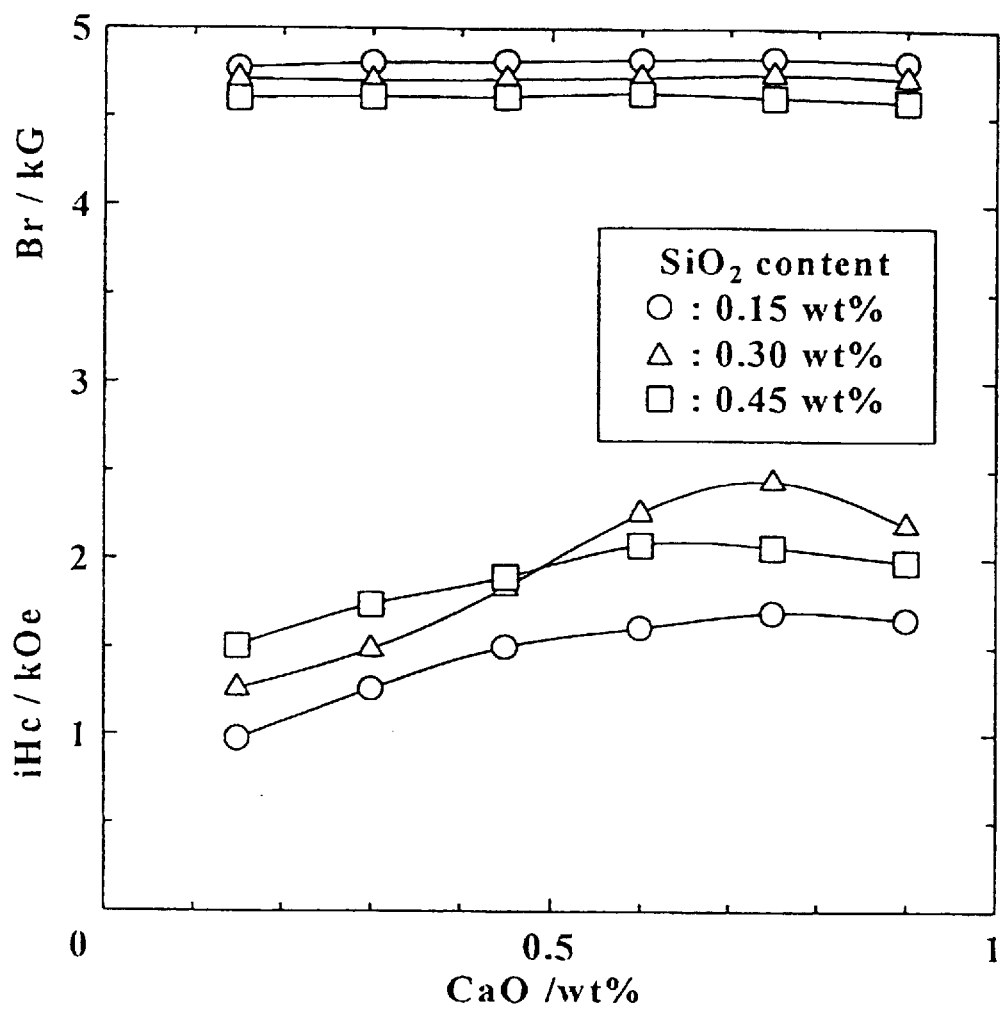
FIG. 4 shows changes in intrinsic coercive force, iHc, and residual flux density, Br, when addition amounts of CaO and $SiO_2$ are varied in the composition of $SrO.2(FeO).7.5(Fe_2O_3)$.

FIG. 4 show the changes in the intrinsic coercive force (iHc) and residual flux density (Br) when CaO addition amount is altered from 0.15 weight % to 0.9 weight % (on x-axis) and $SiO_2$ addition amount is varied from 0.15 wright % (circle marks), 0.30 weight % (triangle marks) to 0.45 weight % (square marks) with respect to a composition of $SrO.2(FeO).7.5(Fe_2O_3)$. Samples presented in FIG. 4 were calcined at 1,340° C. in nitrogen atmosphere, pulverized into fine particles with an average particle size of 0.06 $\mu$m, formed into green compact under the applied magnetic field, and sintered at 1,175° C.

Although the remarkable improvement in intrinsic coercive force can be found in relatively wide range of CaO addition amount, if it is less than 0.3 weight %, the addition effect is not achieved. On the other hand, if the CaO addition amount exceeds 1.5 weight %, Ca ferrite could be produced, perhaps causing a deterioration of magnetic characteristics. Accordingly, the addition amount of CaO would be preferable if it is limited in a range from 0.3 to 1.5 weight %. It is further more preferable if it is limited in a range from 0.5 to 0.8 weight %.

With regard to addition amount of $SiO_2$, it was found that if it is less than 0.1 weight %, no improvement in intrinsic coercive force was recognized; while if it exceeds 0.6 weight %, both intrinsic coercive force and residual flux density were deteriorated. As a consequence, the range between 0.1 weight % and 0.6 weight % is preferable; more specifically it would more preferable if it is limited in a range between 0.3 weight % and 0.4 weight %.

Figure 5:
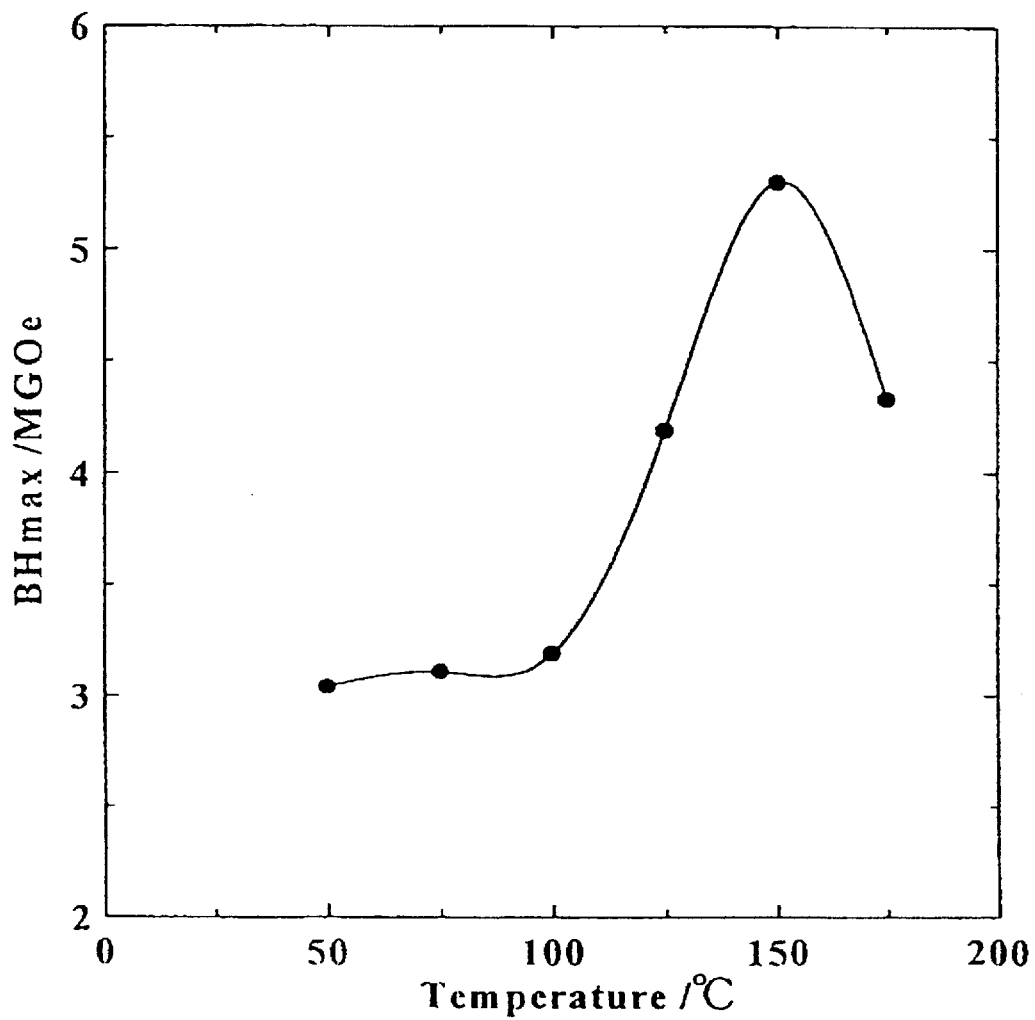
FIG. 5 shows changes in the maximum energy products, (BH)max, as a function of six different drying temperatures for the formed green compact when carbon was not added after the calcination process.

FIG. 5 shows changes in maximum energy products, (BH)max, as a function of drying temperature ranging from 50° C. to 175° C. of the formed green compact when carbon powders are not added after the calcination process. As seen clearly from the figure, for the case when carbon was not added, excellent magnetic properties can be obtained in only a very narrow range of the drying temperature. Accordingly, adding carbon prior to the pulverizing the calcined powders makes the optimum temperature range for drying temperature to shift toward higher temperature side, resulting in stabilizing the excellent maximum energy products, (BH)max.

Figure 6:
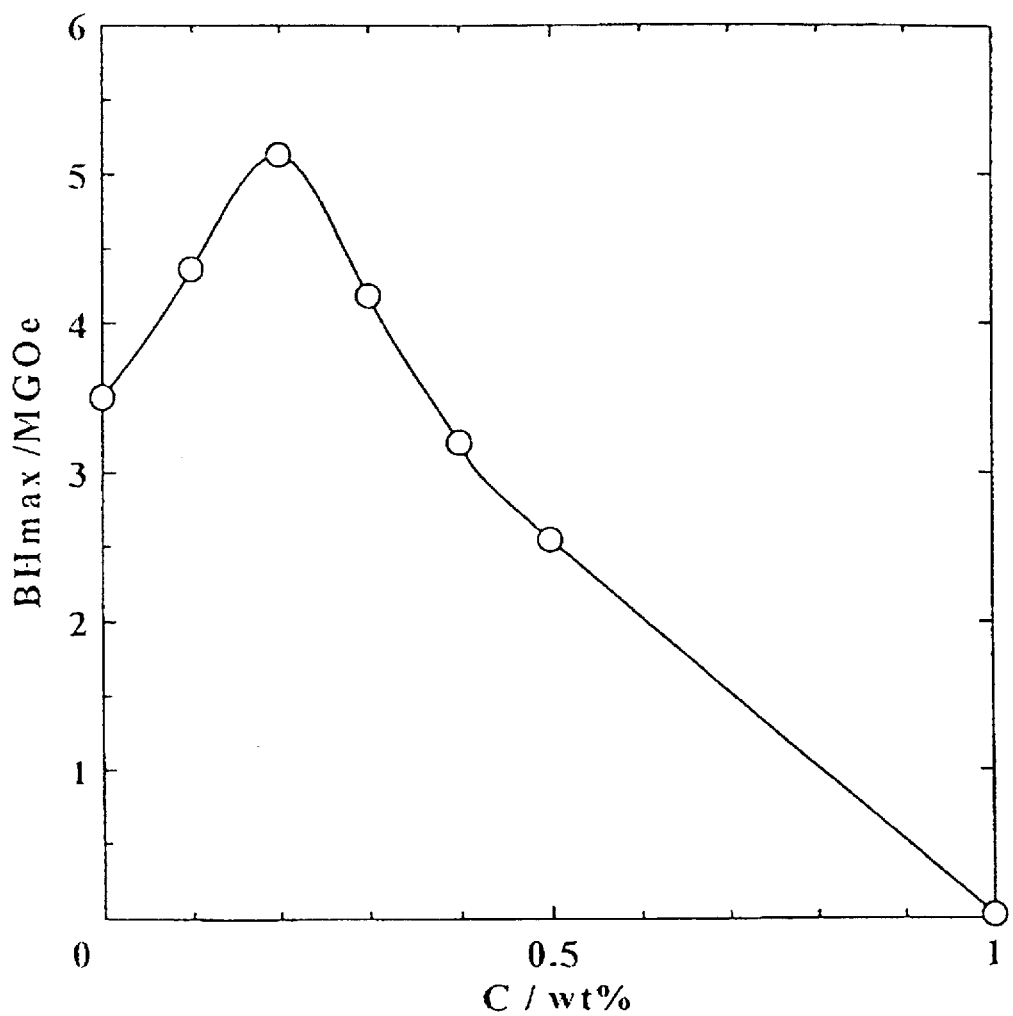
FIG. 6 shows changes in the maximum energy products, (BH)max, of the composition of $SrO.2(FeO).7.5(Fe_2O_3)$ when addition amount of carbon varied from 0 to 1 weight %.

Moreover, FIG. 6 shows the changes in the maximum energy products, (BH)max, when carbon addition amount is altered with respect to the composition $SrO.2(FeO).7.5(Fe_2O_3)$. The samples were calcined at 1,340° C. in nitrogen atmosphere, pulverized into fine particles having average particle size of 0.06 $\mu$m, formed in green compact under the magnetic field, and sintered at 1,150° C.

It was found that carbon addition improves both intrinsic coercive force and residual flux density. Furthermore, carbon addition helps to widen the optimum drying temperature range and to stabilize the excellent maximum energy product, (BH)max, when the formed body is subjected to drying process; said formed body was formed under the magnetic field by using powders which is pulverized through the wet pulverizing process, as will be described later.

The amount of carbon addition is different from the amount required to be added prior to the calcination process. Namely, if it is less than 0.1 weight %, the maximum energy product, (BH)max, is not improved; on the other hand, if it exceeds 0.5 weight %, the maximum energy products tend to decrease. As a consequence, addition amount ranging from 0.1 weight % to 0.5 weight % is preferable; more specifically it would be more preferable if it is limited in a range from 0.1 to 0.3 weight %.

In addition to the above mentioned additive, by adding at least one of $Cr_2O_3$ (ranging from 0.2 to 0.8 weight %) or CoO (ranging from 0.2 to 0.8 weight %), further improvements in both intrinsic coercive force and residual flux density can be achieved.

Figure 7:
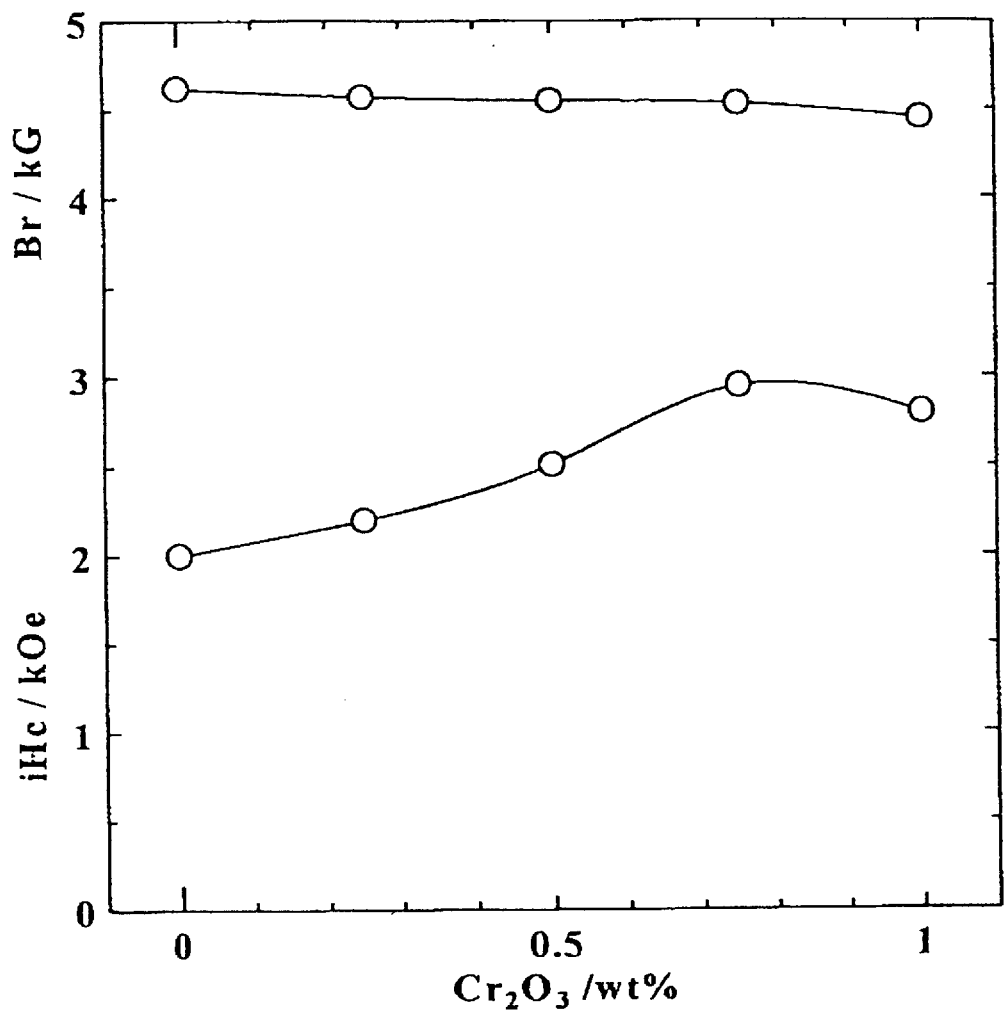
FIG. 7 shows changes in intrinsic coercive force, iHc, and residual flux density, Br, in the composition of $SrO.2(FeO).7.5(Fe_2O_3)$, when addition amount of $Cr_2O_3$ was changed from 0 to 1 weight %.

Namely, with respect to the composition $SrO.2(FeO).7.5(Fe_2O_3)$, the addition amount of $Cr_2O_3$ was altered from 0 to 1 weight % with constant CaO of 0.45 weight % and $SiO_2$ of 0.45 weight %. FIG. 7 demonstrates the changes in intrinsic coercive force, iHc, and residual flux density, Br, as a function of $Cr_2O_3$ addition amount. As seen from FIG. 7 clearly, it was found that the intrinsic coercive force can be improved by adding $Cr_2O_3$ powders. However, there appears to be a limitation; if it is less than 0.2 weight % or more than 0.8 weight %, the intrinsic coercive force decreases. As a result, it is preferable to control the addition amount of $Cr_2O_3$ within a range from 0.2 to 0.8 weight %.

Figure 8:
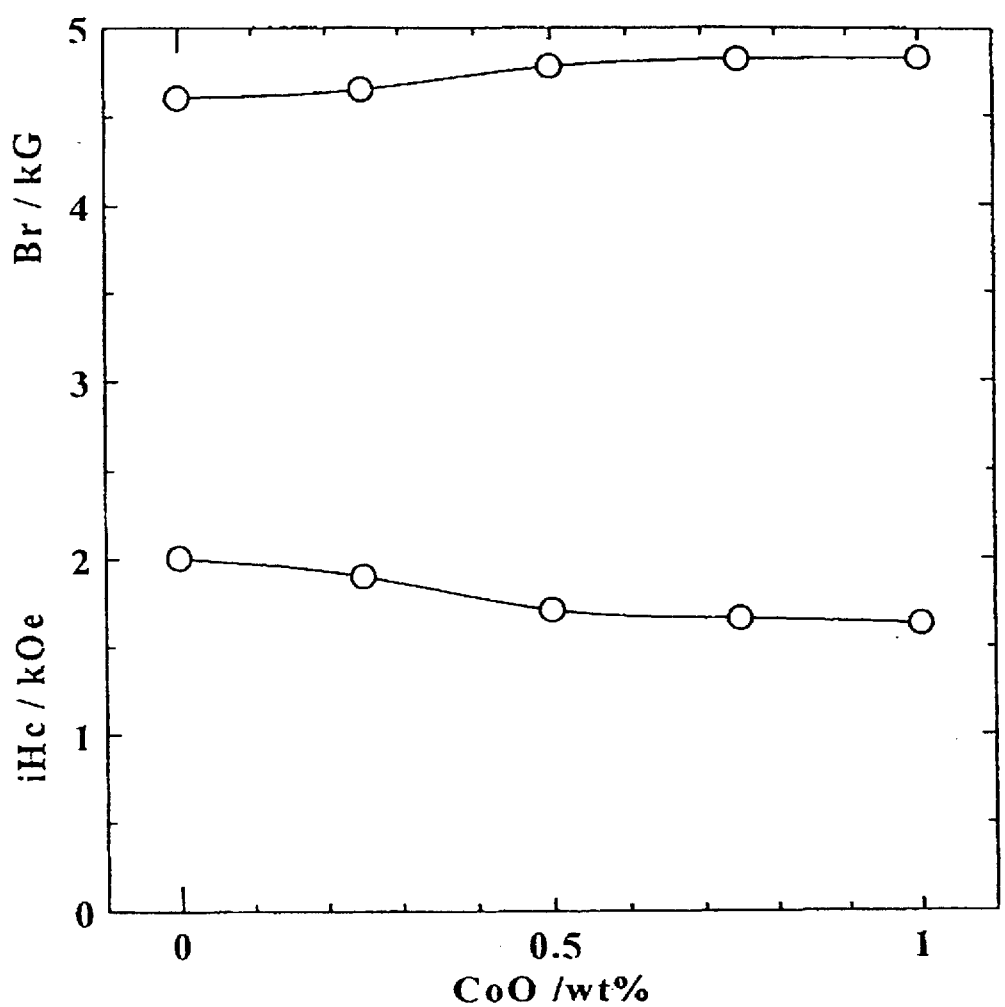
FIG. 8 shows changes in intrinsic coercive force, iHc, and residual flux density, Br, of the composition of $SrO.2(FeO).7.5(Fe_2O_3)$ when addition amount of CoO was altered from 0 to 1 weight %.

Moreover, FIG. 8 shows changes in intrinsic coercive force, iHc, and residual flux density, Br, when CaO and $SiO_2$ are kept constant (i.e., 0.45 weight %, respectively) and addition amount of CoO is altered from 0 to 1 weight %. As seen in FIG. 8, it was found that the residual flux density was improved by adding CoO powders; however the beneficial effect of CoO addition was not recognized if it is less than 0.2 weight %. On the other hand, if it is more than 0.8 weight %, the intrinsic coercive force decreases. Accordingly, it is preferable to control the addition amount of CoO within a range from 0.2 and 0.8 weight %.

Furthermore, in addition to the above mentioned effective additives, it was found that addition of $SrCO_3$ ranging from 0.3 to 1.0 weight % is also effective in terms of improvements of magnetic properties; said addition amount being dependent on other conditions including calcining temperature and particle size of pulverized powders.

The powders being added with various additives are now pulverized into fine particles having an average particle size less than 0.06 $\mu$m. Although the means for pulverizing is not limited to specific technologies, it is preferable to employ the wet pulverization process such as ball mill or attritor mill. The pulverized powders are then subjected to forming into green compact under the applied magnetic field, as known as a prior art.

Figure 9:
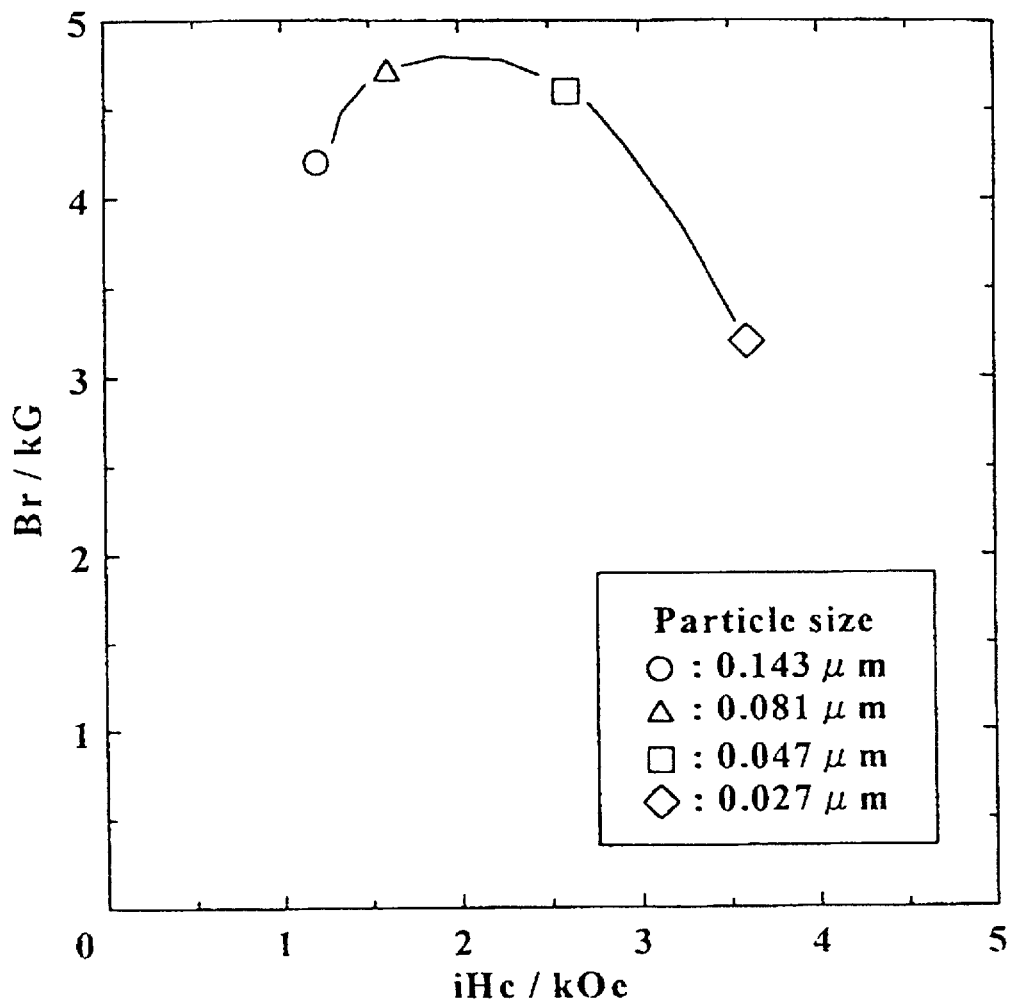
FIG. 9 shows interrelating changes between intrinsic coercive force, iHc, and residual flux density, Br, as a function of four different particle sizes.

FIG. 9 shows changes in residual flux density, Br, when the particles size is varied from 0.027 $\mu$m, 0.047 $\mu$m, 0.081 $\mu$m, to 0.143 $\mu$m. The samples—having a composition $SrO.2(FeO).7.5(Fe_2O_3)$—were mixed with 0.5 weight % of carbon prior to the calcination process, calcined in nitrogen atmosphere at 1,250° C., further added with 0.47 weight % of CaO, 0.3 weight % of SiO$_2$, and 0.17 weight % of C, pulverized into certain particle size powders, followed by forming into the green compact under the applied magnetic field and sintering at 1,175° C.

If the average particle size exceeds 0.06 µm, although the residual flux density, Br, is still improved, an adverse effect was found with the intrinsic coercive force, iHc. Moreover, if the average particle size is too small, although there is an improvement in intrinsic coercive force, iHc, the residual flux density, Br, was deteriorated. As a consequence, the average particle size to be added prior to the calcination process should be controlled to be less than 0.06 µm. The most preferable range for the average particle size would be between 0.04 and 0.06 µm. All data of particle size was obtained by the BET measurement.

As described previously, in a case when the wet pulverizing method such as ball mill is employed, it is preferable to dry the formed green compact at the optimum temperature. Depending upon the addition amount of the carbon or other additives which are added prior to the pulverizing, the preferable temperature range would be in a range between 100° C. and 200° C.

The final stage of the process is the sintering of the formed green compact. Although there is no specific requirements for the sintering process, the preferable sintering atmosphere is a non-oxidizing atmosphere such as an inert gas or vacuum, and the sintering temperature ranging from 1,150° C. to 1,250° C. is preferable. Besides, it is preferable to add an oxidizing agent or a reducing agent if necessary; depending upon the composition of the compact, type of additives, calcining conditions, pulverized particle size, and drying conditions. Carbon or PVA can be used as a reducing agent; while iron sesquioxide (Fe$_2$O$_3$) powder can be employed as an oxidizing agent.

Figure 10:
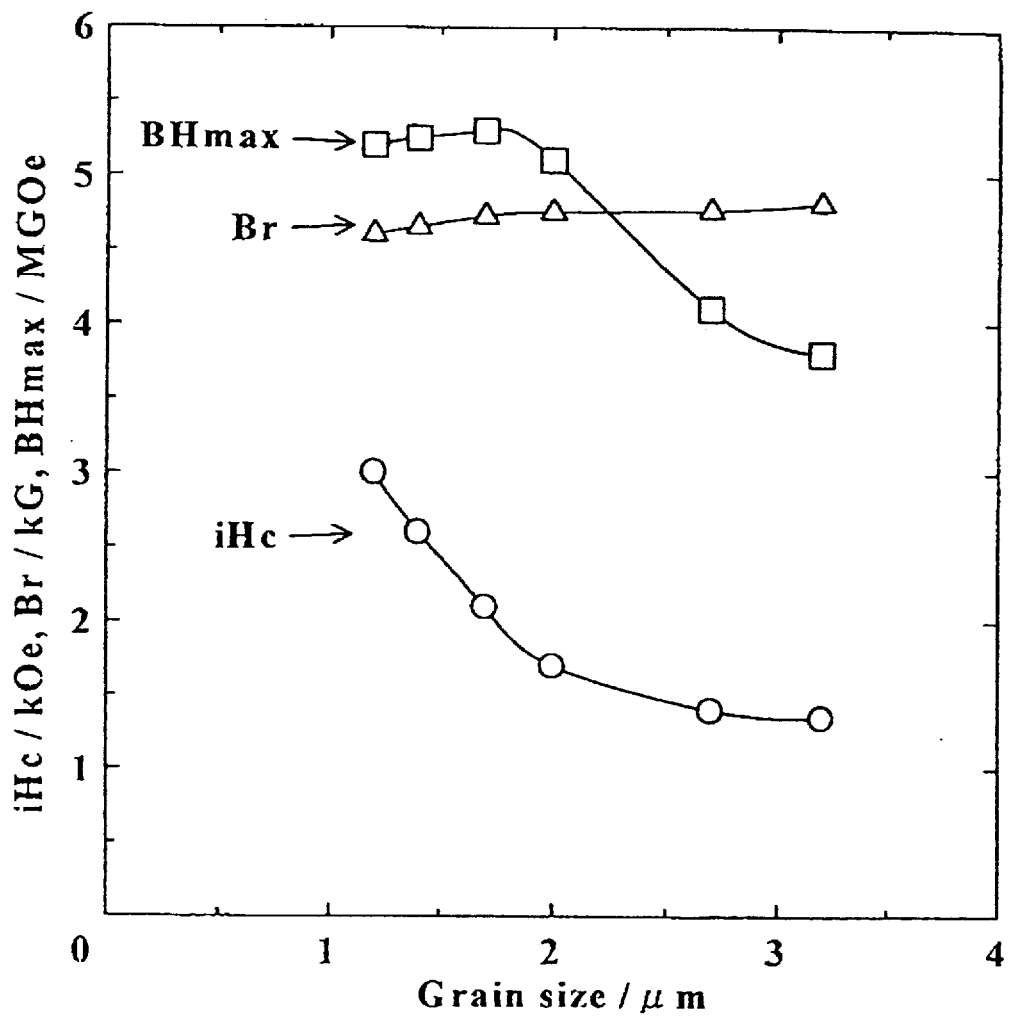
FIG. 10 shows changes in intrinsic coercive force, iHc, residual flux density, Br, and maximum energy products, (BH)max, as a function of average grain sizes.

According to the present invention, the average grain size of produced ferrite magnet is limited less than 2 µm. FIG. 10 shows various magnetic properties (intrinsic coercive force, iHc, residual flux density, Br, and maximum energy products, (BH)max as a function of average grain size in µm. In the composition SrO.2(FeO).n(Fe$_2$O$_3$) (where n=7.2~7.7) of the present invention, it was found that if the average grain size exceeds 2 µm, there is a tendency of decreasing of magnetic properties (especially, intrinsic coercive force). Hence, it is necessary to control the average grain size to be less than 2 µm in order to obtain excellent magnetic properties, particularly the maximum energy products, (BH)max, be 5 MGOe, which has not be achieved with the conventional M-type magnets. The more preferably, the average grain size is controlled within a range from 1.2 to 1.7 µm.

EMBODIMENT

Raw powders were prepared by mixing SrCO$_3$ and Fe$_2$O$_3$ with a mol ratio of 1:8.5. Furthermore 1.5 weight % of carbon was added to raw powders. The mixture was calcined in nitrogen atmosphere at 1,350° C. for 1 hour. To the calcined powders, 0.6 weight % of CaO, 0.3 weight % of SiO$_2$, and 0.2 weight % of C were added, followed by pulverizing by the ball mill to produce fine powders having an average particle size of 0.05 µm.

The pulverized powders were then subjected to the forming into the green compact body under the applied magnetic field. The formed * compact was dried at 200° C. for 2 hours, followed by sintering at 1,175° C. for 1 hour in nitrogen atmosphere.

Figure 11:
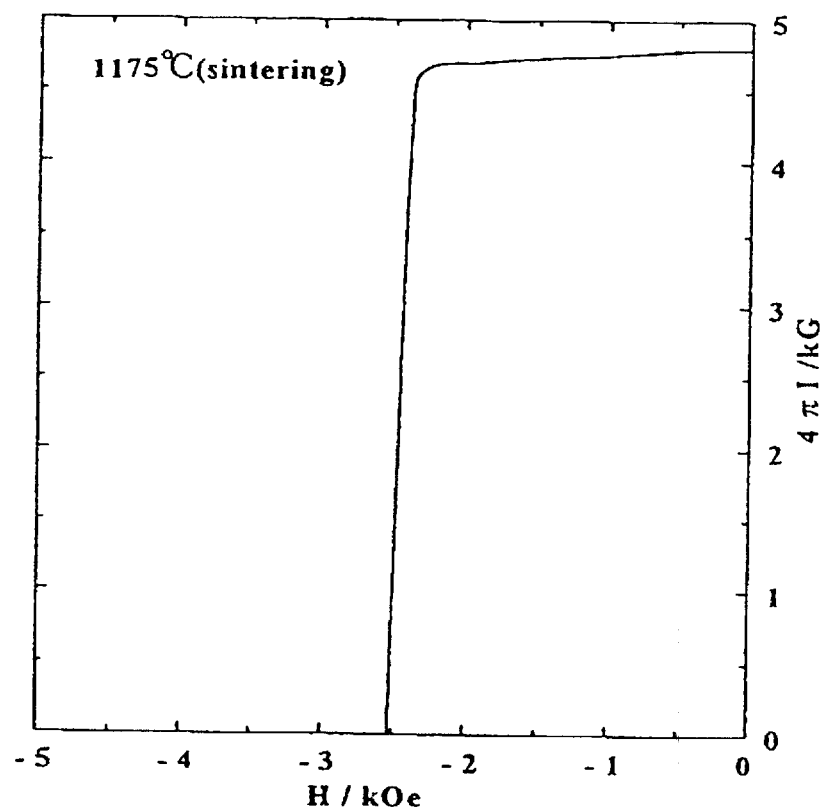
FIG. 11 shows a magnetization curve of the W-type magnet which is fabricated according to the present embodiment.

The magnetic properties of the thus produced W-type magnet as follows; 4 πIs=5.0 kG, Br=4.8 kG, iHc=2.5 kOe, (BH)max=5.3 MGOe. FIG. 11 shows the magnetization curve of the W-type magnet which was produced according to the above procedures.

INDUSTRIAL APPLICABILITY

According to the present invention, it is easily and less-expensively to produce the W-type magnet which has not been realized. The present * invention can also provide the W-type magnet, maintaining a similar cost-performance as the M-type magnet, which said W-type magnet has the maximum energy product, (BH)max, more than 5.0 MGOe, being higher than those found with the conventional M-type magnet.

While this invention has been described with respect to preferred embodiments and examples, it should be understood that the invention is not limited to that precise examples; rather many modifications and variations would present themselves to those of skill in the art without departing from the scope and spirit of this invention, as defined in the appended claims.

I claim:

1. A ferrite magnet, which has a chemical formula as SrO.2(FeO).n(Fe$_2$O$_3$) with an appropriate range of n-value in said formula between 7.2 and 7.7; a sintered body of said formula furthermore having an average particle size of less than 2 µm and the maximum energy products, (BH)max, of more than 5 MGOe.

2. A production process of a w-type ferrite magnet which is processed by the following sequences comprising;

preparing raw powders of SrCO$_3$ and Fe$_2$O$_3$ in a mol ratio of a range between 1:8.2 and 1:8.7;

admixing 0.3 to 5.0 weight % of carbon to the above raw powders;

calcining the admixture;

adding CaO of 0.3 to 1.5 weight %, SiO$_2$ of 0.1 to 0.6 weight % and C of 0.1 to 0.5 weight % to the calcined;

pulverizing the calcined into fine particles with average particle size of less than 0.06 µm;

forming a green compact body using the fine powders under a magnetic field; and sintering the formed green compact in a non-oxidizing atmosphere.

3. The production process cited in claim 2, wherein the process is characterized by adding at least one of 0.2 to 0.8 weight Cr$_2$O$_3$ or 0.2 to 0.8 weight CoO after the calcination process.

4. The production process cited in claim 2, wherein the pulverizing step is wet pulverizing and the formed green compact body is dried at a temperature range from 100° C. to 200° C.

5. The production process cited in claim 2, wherein an oxidizing agent or reducing agent is added before a sintering process.

6. A production process for a powder for a w-type ferrite magnet being characterized by the following sequential processes comprising;

preparing raw powders of SrCO$_3$ and Fe$_2$O$_3$ in a mol ratio range between 1:8.2 and 1:8.7;

adding 0.3 to 5.0 weight % of carbon to the raw powders;

calcining the mixture; and pulverizing the calcined body into fine particles.

7. A powder for W-Type ferrite magnet powder produce by the process of claim 6.

* * * * *